United States Patent
Lin et al.

(10) Patent No.: US 9,838,231 B2
(45) Date of Patent: Dec. 5, 2017

(54) DEMODULATING CIRCUIT AND THE METHOD THEREOF

(71) Applicant: National Tsing Hua University, Hsin Chu (TW)

(72) Inventors: Yu-Po Lin, Miaoli County (TW); Kea-Tiong Tang, Taipei (TW); Hsin Chen, HsinChu (TW)

(73) Assignee: National Tsing Hua University, Hsin Chu (TW)

( * ) Notice: Subject to any disclaimer, the term of this patent is extended or adjusted under 35 U.S.C. 154(b) by 57 days.

(21) Appl. No.: 14/995,184

(22) Filed: Jan. 13, 2016

(65) Prior Publication Data

US 2017/0026209 A1 Jan. 26, 2017

(30) Foreign Application Priority Data

Jul. 20, 2015 (TW) .............................. 104123443 A

(51) Int. Cl.
*H04L 27/24* (2006.01)
*H04L 27/06* (2006.01)

(52) U.S. Cl.
CPC .............. *H04L 27/24* (2013.01); *H04L 27/06* (2013.01)

(58) Field of Classification Search
CPC ...................................................... H04L 27/066
USPC .......................................................... 375/320
See application file for complete search history.

(56) References Cited

U.S. PATENT DOCUMENTS

| 2005/0184154 | A1* | 8/2005 | Tanaka | G06K 7/10079 235/385 |
| 2007/0191888 | A1* | 8/2007 | Wang | A61N 1/32 607/2 |
| 2009/0046809 | A1* | 2/2009 | Meltzer | H04L 27/06 375/308 |
| 2016/0127161 | A1* | 5/2016 | Murali | H04L 27/1566 375/320 |

* cited by examiner

*Primary Examiner* — Michael Neff
(74) *Attorney, Agent, or Firm* — Chih Feng Yeh; Huntington IP Consulting Co., Ltd.

(57) ABSTRACT

The present invention discloses a demodulating method for a demodulating circuit. The demodulating method comprises a step of utilizing a wave-shaping voltage step-down circuit to perform a wave-shaping process for a modulating input signal. A separate circuit of modulating input signal is filtering data zero of the modulating input signal and reserving data one of the modulating input signal. A triggering circuit of data recover is used to start the count of data span, until the data count is completed. A data recover circuit is used to recover the data.

20 Claims, 5 Drawing Sheets

DEMODULATING CIRCUIT AND THE METHOD THEREOF

CROSS-REFERENCE TO RELATED APPLICATIONS

The present application claims the benefit of TAIWAN Patent Application Serial Number 104123443 filed on Jul. 20, 2015, which is herein incorporated by reference.

TECHNICAL FIELD

The present invention relates to signal demodulation, and more specifically to a method of signal demodulating of Load Shift Keying (LSK) or Amplitude Shift Keying (ASK).

BACKGROUND OF RELATED ARTS

The implant device is created with the developing of the technology, and it causes the large change to medical science. With the evolution of the semi-conductor process, the size and power consumption of total device are reduced, making the implant device is more complex in design. Now implant device is combined with wireless power and data transmission, and it not only improves the problem of power supplying but also becomes more convenient in using.

An AC-DC converter is combined with the rectifier and the controller of the DC-DC converter, so it can get the function of rectification and regulation at the same time, and reduce the area and power consumption of the total device. This circuit also transfers the loading condition back to the external device by LSK (Load shift keying). It can use the feedback signal to determine if the input power is not enough or excessive, which increases the efficiency of the total system. It also transfers the loading condition back to the external device by LSK. After demodulating, the feedback signal can be used to control the output power of external device, which makes the implant device receives the suitable power.

Except medical science, the current mobile phones, tablet computers and other electronic devices are to exchange information via wireless transmission. Information of wireless communication data or digital data is carried by invisible radio waves. Information carried on the radio wave can be of various types, including audio, video signals, computer data and so on. Information is carried to the radio wave through the modulator for transmission. When the carrier wave reaches the destination, information will be recovered from the radio wave through the demodulation process. So, a series of procedures including modulating the information onto radio waves, transmitting radio waves, and demodulating information from the received radio wave, are the kernel of wireless technology.

Traditional load modulating/demodulating circuit is mainly utilizing a rectifier for processing input modulation signal to remove negative half-cycle of AC signal, and using a filter to extract the envelope of signal, and utilizing a comparator for demodulating the original input signal to recover. Traditional demodulating circuit is utilizing the amount of energy accumulated by the demodulating circuit to judge which the original signal is high or low. Because it needs some time to accumulate energy, so it highly limits the data transmission rate.

In view of the drawbacks of the conventional arts, the present invention proposes a new digital demodulation circuit to significantly improve amount of data transmission and speed of data transmission, which can be widely used in the demodulation method among the wireless field.

SUMMARY

One objective of the present invention is to provide a method for demodulating of a demodulating circuit, comprising utilizing a wave-shaping voltage step-down circuit to perform a wave-shaping process for a modulating input signal; utilizing a separate circuit to filter data zero of the modulating input signal and reserving data one of the modulating input signal; utilizing a triggering circuit to start counting of span of data, until counting of data is completed; and utilizing a data recover circuit to recover data.

According to an aspect of the invention, the method further comprises wave-shaping negative half-cycle signal changing to positive half-cycle signal of the modulating input signal, and dropping voltage amplitude in a permitting range of availably operating for the demodulating circuit.

According to another aspect of the invention, the method further comprises a step of resetting the triggering circuit for waiting next triggering when the counting of data is completed.

According to another aspect of the invention, counting of span of data is performed by a counter of data span.

According to one aspect of the invention, data zero of the modulating input signal is filtered by an analog amplifier circuit.

According to one aspect of the invention, the wave-shaping voltage step-down circuit includes at least one amplifier, at least one diode and at least one capacitor.

According to one aspect of the invention, the triggering circuit includes a first D-type flip-flop.

According to one aspect of the invention, the counter of data span includes a first counter and a reset circuit.

According to one aspect of the invention, the recover circuit includes a second counter and a second D-type flip-flop.

According to one aspect of the invention, the recover circuit includes a second counter and a second D-type flip-flop.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

The invention will now be described in greater detail with preferred embodiments of the invention and illustrations attached. Nevertheless, it should be recognized that the preferred embodiments of the invention are only for illustration. Besides the preferred embodiment mentioned here, the present invention can be practiced in a wide range of other embodiments besides those explicitly described, and the scope of the present invention is expressly not limited except as specified in the accompanying claims.

Figure 3:
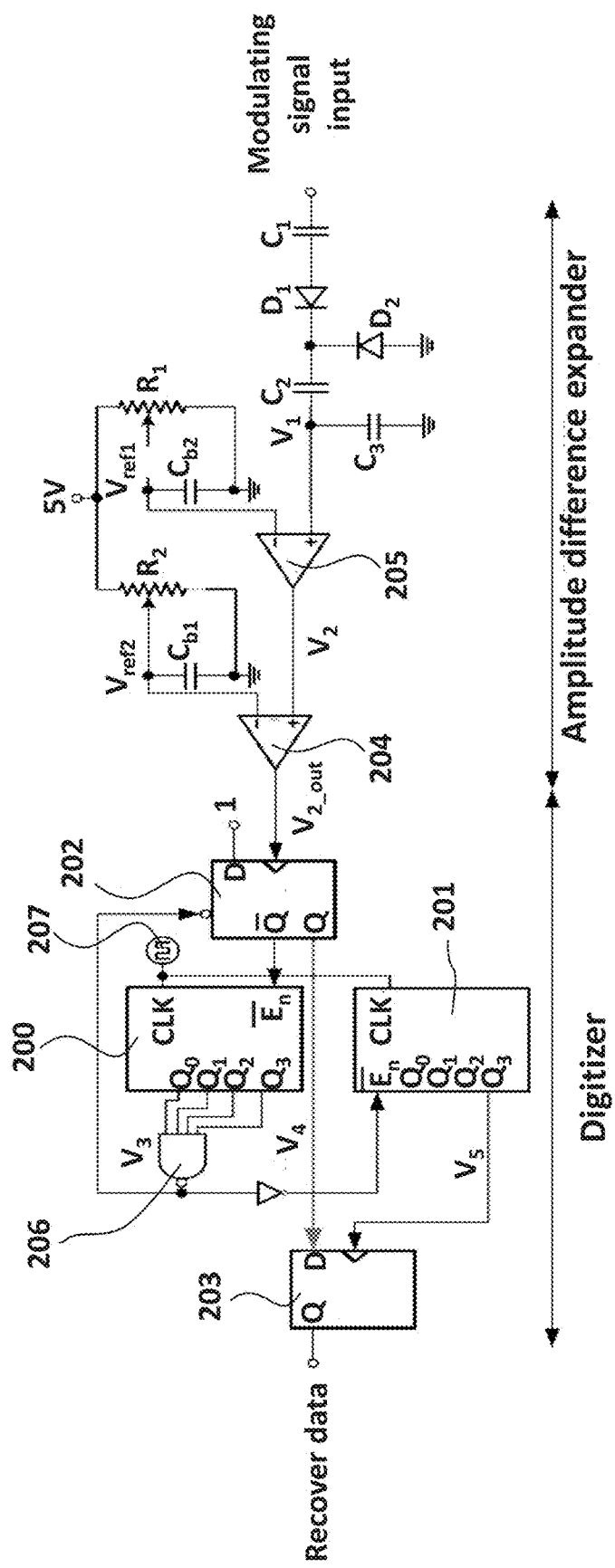
FIG. 3 illustrates a digitized load modulating/demodulating circuit according to another embodiment of the invention.

Please refer to FIG. 3, in the concept of the present invention, it utilizes a front-end analog amplifier circuit to extract pulse signal of input, and then the pulse signal is processed to be recovered circuit signal via a digital demodulation circuit (demodulator). The extracted pulse signal is fed into the digital demodulation circuit, wherein the digital demodulation circuit includes two D-type flip-flops and two counters. The first D-type flip-flop is used to detect the pulse signal of input to trigger the first counter for counting to calculate data span of the input signal to be recovered. When the first counter is counting to reach the required span of data, the second counter is triggered to resample for the signal to be demodulated and followed by recovering the input signal. Circuit system and demodulation method of the present invention may only perform a detection of the first pulse signal to recover the original input signal, and therefore it significantly improves speed of data transmission. In other words, the proposed method according to the present invention only needs to detect the first one or two pulse signals (peak) to determine that the signal is digital "1" of LSK or ASK. The modulation signal of Load Shift Keying (LSK) is usually obtained by modulating the carrier wave signal as digital signal (data) with high/low voltage level to be transmitted, and the modulated carrier wave signal is then transmitting. LSK modulation allows energy and data transmission via an identical radio frequency electromagnetic wave. The modulation signal of Amplitude Shift Keying (ASK) is usually used to transmit the input commands.

Figure 1:
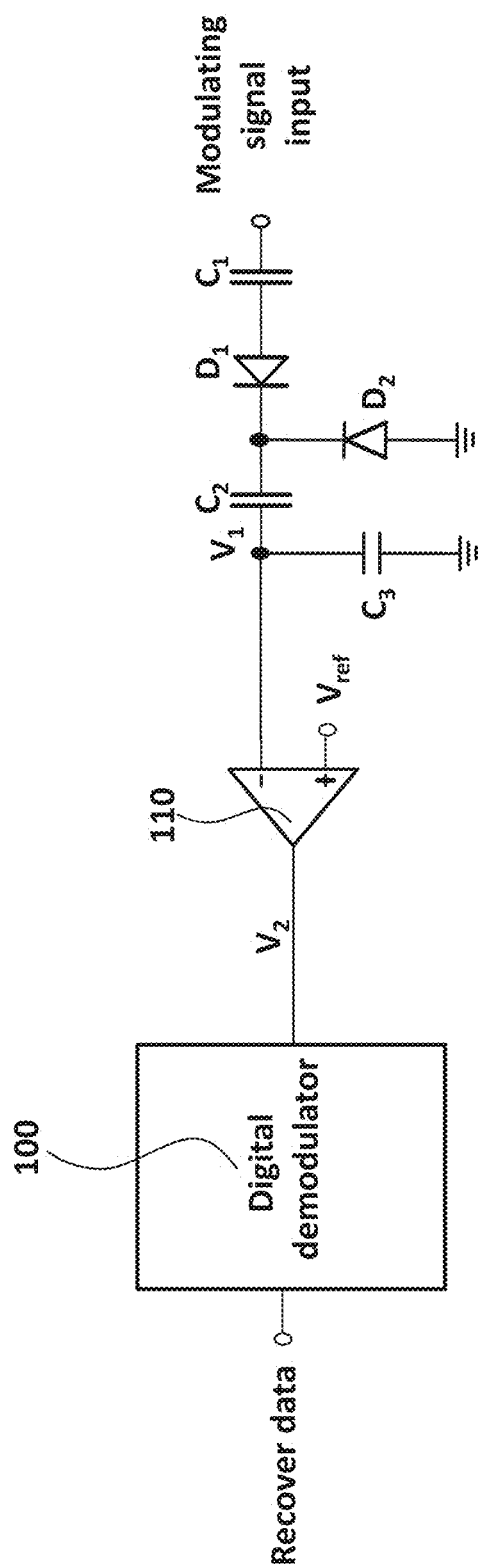
FIG. 1 illustrates a digitized load modulating/demodulating circuit according to one embodiment of the invention.
Figure 2:
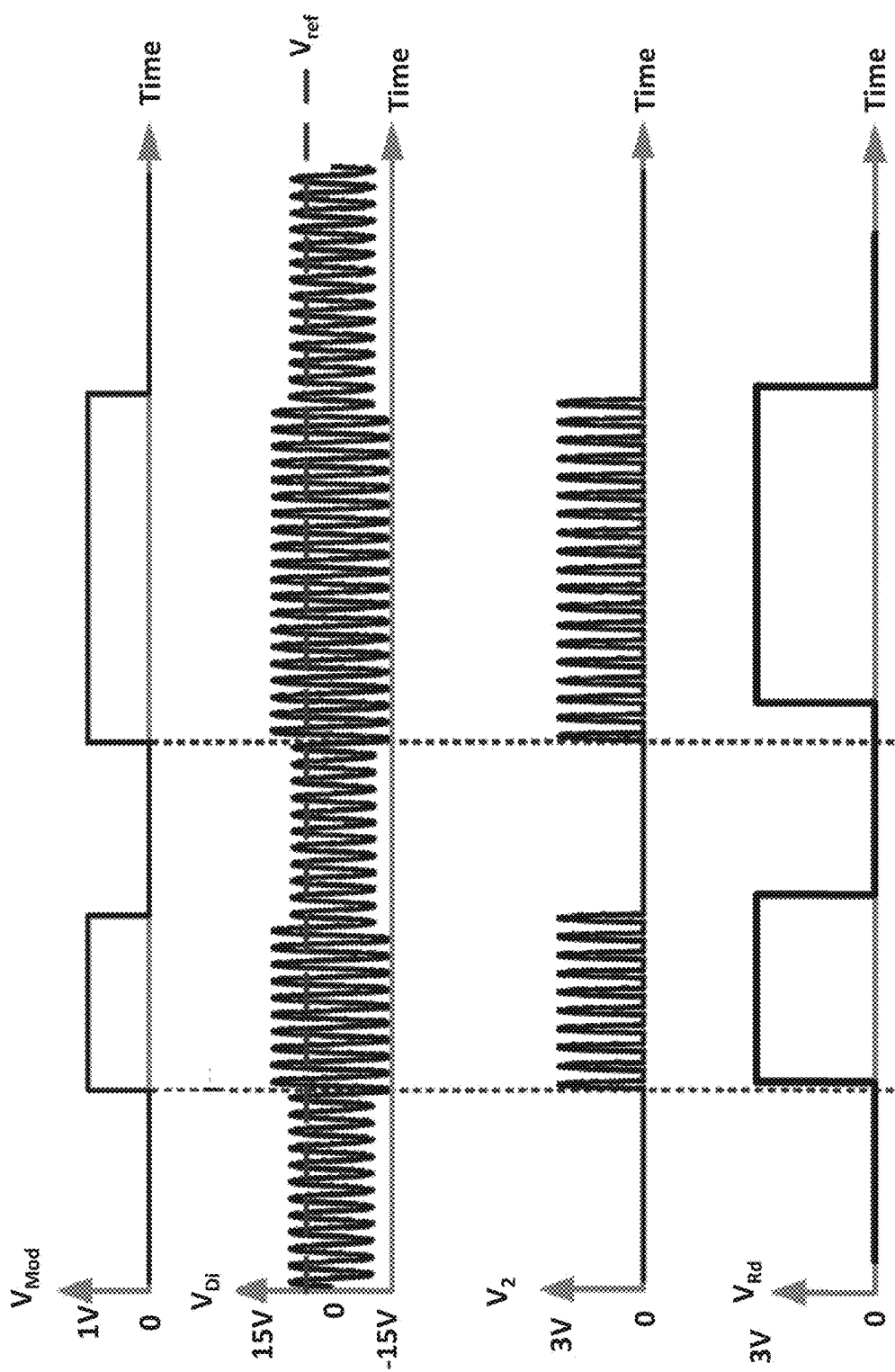
FIG. 2 illustrates a voltage signal (voltage vs. time) at respective circuit nodes of the digitized load modulating/demodulating circuit.

Please refer to FIG. 1, it illustrates a digitized load modulating/demodulating circuit according to the invention. The invention proposes an analog amplifier circuit combining with a digital demodulation circuit for enhancing speed of demodulation, and thereby reaching the purpose of high speed of data transmission, which circuit structure is shown in FIG. 1. The digitized load modulating/demodulating circuit includes a digital demodulator 100 and an analog amplifier circuit 110. The digital demodulator 100 is electrically coupled to the analog amplifier circuit 110. A modulating signal is inputted into the digitized load modulating/demodulating circuit to be adjusted (rectified) voltage and current of the modulating signal via capacitors and diodes. In this embodiment, the modulating signal is performing a process of voltage regulating and rectifying via the cascade of capacitor $C_1$, diode $D_1$ and capacitor $C_2$ and the parallel connection of diode $D_2$ and capacitor $C_3$. One terminal of the diode $D_2$ and the capacitor $C_3$ is respectively connected to a corresponding node at two ends of the capacitor $C_2$. One terminal of the diode $D_2$ is connected to a node between an output terminal of the diode $D_2$ and the capacitor $C_2$, and another terminal of the diode $D_2$ is grounded. Another terminal of the diode $D_3$ is grounded. One terminal of the capacitor $C_3$ is connected to a node between an input terminal of the amplifier circuit 110 and the capacitor $C_2$. The modulating signal after voltage regulating and rectifying is output voltage $V_1$ and then fed into an input terminal (such as negative input terminal) of the amplifier circuit 110. In one embodiment, a reference voltage ($V_{ref}$) is fed into another input terminal (such as positive input terminal) of the amplifier circuit 110, and the regulated voltage $V_1$ of the modulating signal is transferred to voltage $V_2$, only the pulses representing data "1" are generated from the amplifier circuit 110 after comparing $V_1$ with $V_{ref}$, as shown in FIG. 2. Subsequently, voltage $V_2$ of the modulating signal is demodulated to be as recover data via the digital demodulator 100.

During digital demodulating, the modulating signal is directly feeding into the digital demodulator 100 after error magnifying of the amplifier circuit 110. Thus, in the digitized load modulating/demodulating circuit of the invention, there is no need to utilize envelope detector, and no need to utilize RC circuit for further integrating to the input signal, and therefore it significantly reduces time of demodulating. As shown in FIG. 2, it shows voltage signal (voltage vs. time) at respective circuit nodes of the digitized load modulating/demodulating circuit, wherein the voltage signal from the upper to the lower of the drawing is respectively indicating waveform of modulating signal ($V_{Mod}$), waveform of demodulating signal input ($V_{Di}$), waveform of output voltage ($V_2$) after processed by the amplifier circuit 110, waveform of recover data ($V_{Rd}$) after processed by the digital demodulator 100.

The digital demodulating circuit of the present invention may only perform a detection of the first pulse signal to recover the input signal to be demodulated. Therefore, comparing with the conventional demodulating circuit which needs to utilize integrator, demodulating method of the invention can significantly enhance quantity of data transmission and speed of data transmission.

Please refer to FIG. 3, it illustrates a digitized load modulating/demodulating circuit according to another embodiment of the invention. As shown in FIG. 3, the digitized load modulating/demodulating circuit includes two parts which are signal amplifying circuit (amplitude difference expander) and digital conversion circuit (digitizer). For example, the signal amplifying circuit includes a first amplifier circuit 205, a second amplifier circuit 204, a first capacitor $C_1$, a first diode $D_1$, a second capacitor $C_2$, a second diode $D_2$, a third capacitor $C_3$, a first variable resistor $R_1$, a second variable resistor $R_2$. The first amplifier circuit 205 and the second amplifier circuit 204 are cascaded to construct as a set of signal amplifier. The first variable resistor $R_1$ and the second variable resistor $R_2$ are respectively connected in parallel to a first bypass capacitor $C_{b1}$ and a second bypass capacitor $C_{b2}$. One terminal of the first variable resistor $R_1$ and the second variable resistor $R_2$ are electrically connected to a voltage input terminal. One terminal node of the first bypass capacitor $C_{b1}$ and the second bypass capacitor $C_{b2}$ may be electrically fed into a first reference voltage ($V_{ref1}$) and a second reference voltage ($V_{ref2}$), respectively. The first reference voltage ($V_{ref2}$) and the second reference voltage ($V_{ref2}$) are respectively inputted into an input terminal (such as negative input terminal) of the first amplifier circuit 205 and the second amplifier circuit 204.

In this embodiment, a modulating signal is inputted into the digitized load modulating/demodulating circuit to be stabilizing and rectifying for the modulating signal via the cascaded first capacitor $C_1$, the first diode $D_1$ and the second capacitor $C_2$, and the paralleled second diode $D_2$ and the third capacitor $C_3$. One terminal of the second diode $D_2$ and the third capacitor $C_3$ is respectively connected to a corresponding node at two ends of the second capacitor $C_2$. One terminal of the second diode $D_2$ is connected to a node between an output terminal of the first diode $D_1$ and the second capacitor $C_2$, and another terminal of the diode $D_2$ is grounded. Another terminal of the third diode $D_3$ is grounded. One terminal of the third capacitor $C_3$ is connected to a node between an input terminal of the amplifier circuit 110 and the second capacitor $C_2$. The modulating signal after voltage regulating and rectifying is output voltage $V_1$ and then fed into another input terminal (such as positive input terminal) of the first amplifier circuit 205. In one embodiment, a voltage (such as 5 volts) is fed into one terminal of the first variable resistor $R_1$, the first reference voltage ($V_{ref1}$) fed into an input terminal (such as negative input terminal) of the first amplifier circuit 205, and the regulated voltage $V_1$ of the modulating signal fed into another input terminal (such as positive input terminal) of the first amplifier circuit 205, and thereby outputting voltage $V_2$ from the first amplifier circuit 205 after feeding by the above three voltage applying. In another situation, a voltage (such as 5 volts) is fed into one terminal of the second variable resistor $R_2$, the second reference voltage ($V_{ref2}$) fed into an input terminal (such as negative input terminal) of the second amplifier circuit 204, and the output voltage $V_2$ of the first amplifier circuit 205 fed into another input terminal (such as positive input terminal) of the second amplifier circuit 204, and thereby outputting voltage $V_{2\_out}$ from the second amplifier circuit 204 after feeding by the above three voltage applying. The output voltage $V_{2\_out}$ is the output voltage of the whole signal amplifying circuit.

Therefore, the output voltage $V_2$ of the first amplifier circuit 205 can be adjusted or determined by the three applying voltages, (1) an input voltage fed into the first variable resistor $R_1$, (2) the first reference voltage ($V_{ref1}$) fed into an input terminal (such as negative input terminal) of the first amplifier circuit 205, and (3) the regulated voltage $V_1$ of the modulating signal fed into another input terminal (such as positive input terminal) of the first amplifier circuit 205. Besides, the output voltage $V_{2\_out}$ of the second amplifier circuit 204 can be adjusted or determined by the three applying voltages, (1) an input voltage fed into the second variable resistor $R_2$, (2) the second reference voltage ($V_{ref2}$) fed into an input terminal (such as negative input terminal) of the second amplifier circuit 204, and (3) the output voltage $V_2$ of the first amplifier circuit 205 fed into another input terminal (such as positive input terminal) of the second amplifier circuit 204.

The digital conversion circuit (digital demodulator) of the invention includes two D-type flip-flops (first D-type flip-flop 202, second D-type flip-flop 203) and two counters (first counter 200, second counter 201). The principle of operation describes as following: detecting the pulse signal of input by the first D-type flip-flop 202 to trigger the first counter 200 for counting to the pre-defined time span of one-bit datum, when the first counter 200 reaches the pre-defined span of one-bit datum, the second counter 201 is triggered to generate the clock signal $V_5$, which subsequently triggers the second D-type flip-flop 203 to resample the output of the first D-type flip-flop, so as to recover the data carried on the input signal. The circuit system of the present invention may only perform a detection of the first pulse signal to recover the original input signal, and therefore it significantly enhances speed of data transmission.

Figure 4:
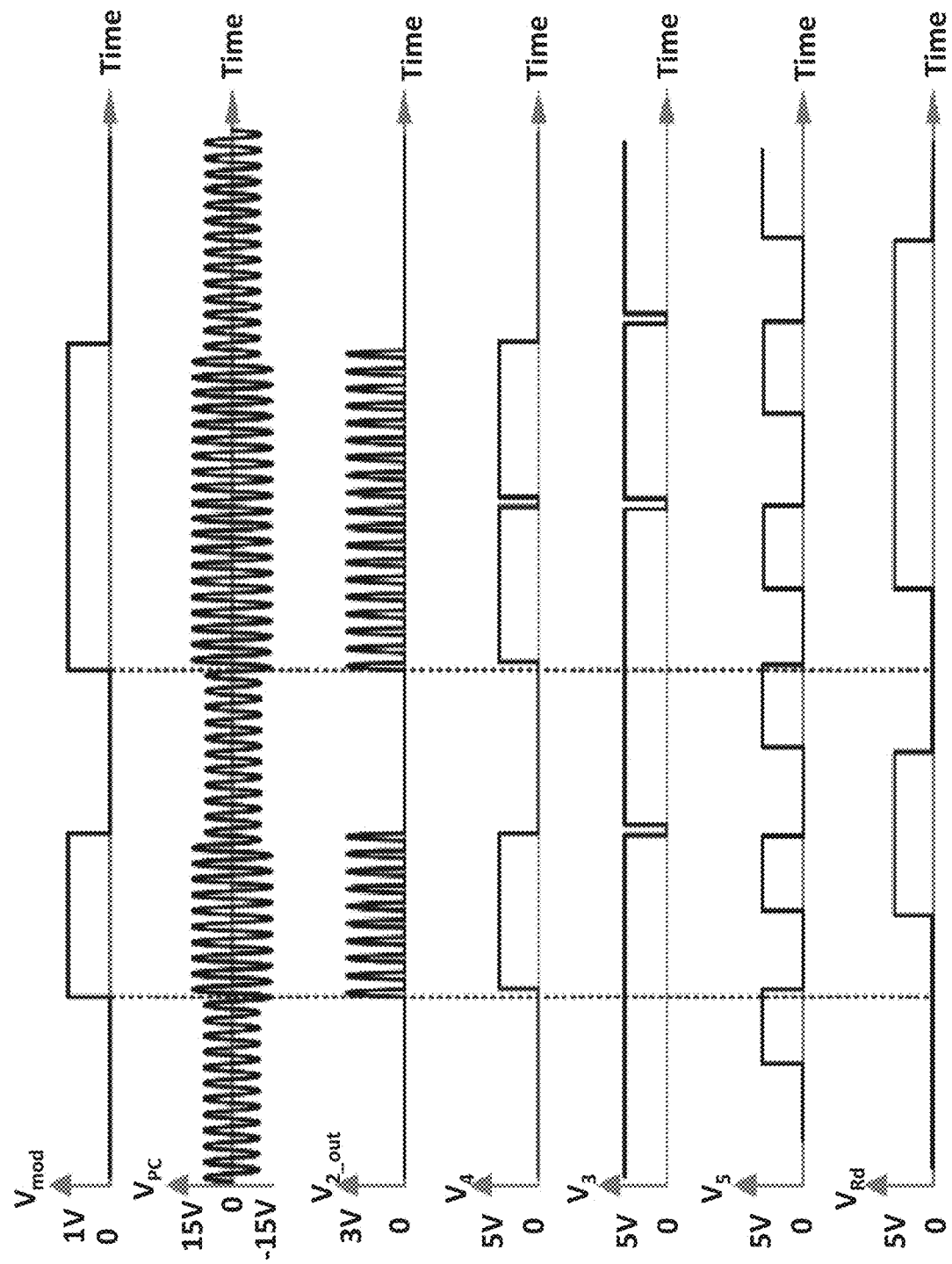
FIG. 4 illustrates a voltage signal at respective circuit nodes of the digitized load modulating/demodulating circuit according to the invention.

In the present invention, it utilizes a front-end analog amplifier circuit (the first amplifier circuit 205 and the second amplifier circuit 204) to extract pulse signal of input, and then the pulse signal is processed to be recovered circuit signal via a digital demodulation circuit (demodulator). As shown in FIG. 4, it shows voltage signal (voltage vs. time) at respective circuit nodes of the digitized load modulating/demodulating circuit, wherein the voltage signal from the upper to the lower of the drawing is respectively indicating waveform of modulating signal ($V_{Mod}$), waveform of demodulating signal input ($V_{primary\ coil}$:$V_{pc}$), waveform of output voltage ($V_{2\_out}$) after processed by the second amplifier circuit 204, waveform of the output voltage ($V_{pre\_data}$: $V_4$) of the first D-type flip flop 202, waveform of voltage ($V_{reset}$:$V_3$) of resetting the first D-type flip flop 202 and the first counter 200, waveform of voltage ($V_{resample}$:$V_5$) for resampling the output of the first D-type flip flop 202, and waveform of recover data ($V_{Rd}$) after processed by the digital demodulator. $V_{2\_out}$ is determined by error magnifying for input signal and extracting pulse signal of input via the front-end analog amplifier circuit. The extracted pulse signal ($V_{2\_out}$) is directly feeding into the digital demodulator. The voltage resetting for the first counter 200 may be performed by a reset circuit 206. The first counter 200 and the second counter 201 are electrically connected to a constant frequency oscillator 207 for retaining operation frequency.

Moreover, the present invention utilizes a detection of the first pulse signal to demodulate the original input signal, and recover the original input signal by digital demodulating, and therefore it significantly improves speed of data transmission and greatly shortens the time of its judgment of demodulation, for example the detection and judgment completed within 1 or 2 cycles of a carrier signal.

Figure 5:
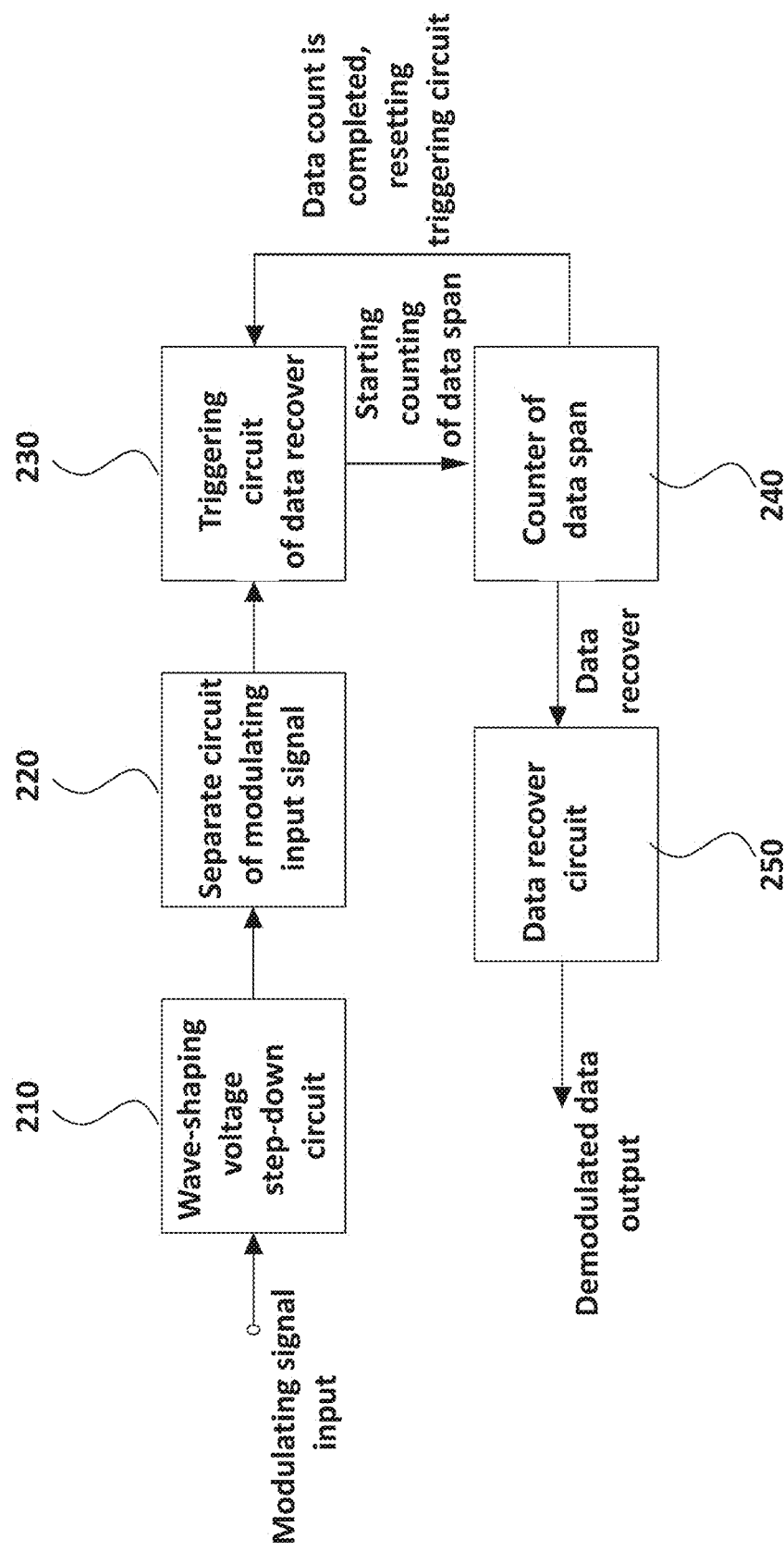
FIG. 5 illustrates a process flow of demodulating process of digitized demodulating circuit according to one embodiment of the invention.

Please refer to FIG. 5, it illustrates a process flow of demodulating process of digitized demodulating circuit according to one embodiment of the invention. The demodulating process of the invention may be applied to demodulating procedure of the digitized demodulating circuit or analog demodulating circuit. That is, in some embodiments, demodulating process of the invention can be used in demodulating procedure of the digital circuit system or analog circuit system. In this embodiment, demodulating process of the invention comprises:

Step one: utilizing a wave-shaping voltage step-down circuit 210 to perform a wave-shaping process (such as full wave or half-wave shaping) for a modulating input signal, wave-shaping the negative half-cycle signal changing to positive half-cycle signal of the modulating input signal, and dropping voltage amplitude in a permitting range of operating for digital demodulation circuit; in one embodiment, the wave-shaping voltage step-down circuit 210 for example includes the first capacitor $C_1$, the first diode $D_1$, the second capacitor $C_2$, the second diode $D_2$, and the third capacitor $C_3$, in FIG. 3;

Step two: utilizing a separate circuit of modulating input signal 220 for filtering data "0" (zero) of the modulating input signal and reserving data "1" (one) of the modulating input signal; in one embodiment, the separate circuit of modulating input signal 220 for example includes the first amplifier circuit 205 and the second amplifier circuit 204 in FIG. 3;

Step three: sending the data "1" (one) of the modulating input signal into a triggering circuit of data recover 230 to start counting of data span by the triggering circuit of data recover 230, until counting of the data by a counter of data span 240 is completed, resetting the triggering circuit 230 for waiting next triggering; in one embodiment, the triggering circuit of data recover 230 for example includes first D-type flip-flop 202 in FIG. 3;

Step four: sending data into a data recover circuit 250 to recover the data to complete the demodulating procedure after counting completely by the counter of data span 240, and outputting the demodulated data; in one embodiment, the counter of data span 240 for example includes the first counter 200 and the reset circuit 206 in FIG. 3; in one embodiment, data recover circuit 250 for example includes the second counter 201 and the second D-type flip-flop 203.

The present invention proposes an analog amplifier circuit combining with digital demodulation circuit to enhance speed of data demodulating, and thereby improving speed of data transmission and enhancing quantity of data transmission. Comprising with the tradition demodulating method of demodulating circuit with an integrator for integrating to the input signal, demodulating method of the present invention processes an un-expected result from the conventional method of demodulating.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A demodulating method of a demodulating circuit, comprising:
    utilizing a wave-shaping voltage step-down circuit to perform a wave-shaping process for a modulating input signal;
    utilizing a separation circuit to filter data zero of a data of said modulating input signal and reserving data one of said data of said modulating input signal;
    utilizing a triggering circuit to start counting of a span of said data, until said counting of said data is completed; and
    utilizing a data recover circuit to recover said data.

2. The method in claim 1, wherein said wave-shaping process includes full wave shaping or half-wave shaping.

3. The method in claim 1, wherein said wave-shaping process includes wave-shaping negative half-cycle signal changing to positive half-cycle signal of said modulating input signal.

4. The method in claim 3, wherein said wave-shaping process further includes dropping voltage amplitude in a permitting range of operating for said demodulating circuit.

5. The method in claim 4, wherein said wave-shaping voltage step-down circuit include a cascade of a first capacitor, a first diode and a second capacitor and a parallel connection of a second diode and a third capacitor.

6. The method in claim 5, wherein said separation circuit includes a cascade of first and a second amplifier.

7. The method in claim 6, wherein said triggering circuit includes a first D-type flip-flop.

8. The method in claim 7, wherein said counting of a span of said data is performed by a counter.

9. The method in claim 8, wherein said counter includes a first counter and a reset circuit.

10. The method in claim 9, wherein said data recover circuit includes a second counter and a second D-type flip-flop.

11. The method in claim 1, further comprising outputting a demodulated data.

12. The method in claim 11, wherein said wave-shaping process includes full wave shaping or half-wave shaping.

13. The method in claim 11, wherein said wave-shaping process includes wave-shaping negative half-cycle signal changing to positive half-cycle signal of said modulating input signal.

14. The method in claim 1, further comprising a step of resetting said triggering circuit for waiting next trigger when said counting of said data is completed.

15. The method in claim 14, further comprising outputting a demodulated data.

16. The method in claim 15, wherein said separation circuit includes a cascade of first and a second amplifier.

17. The method in claim 16, wherein said triggering circuit includes a first D-type flip-flop.

18. The method in claim 17, wherein said counting of a span of said data is performed by a counter.

19. The method in claim 18, wherein said counter includes a first counter and a reset circuit.

20. The method in claim 19, wherein said data recover circuit includes a second counter and a second D-type flip-flop.

* * * * *